Figure 3:
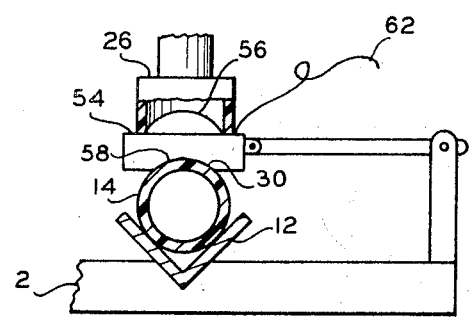

United States Patent [19]

Louthan et al.

[11] 3,743,566
[45] July 3, 1973

[54] APPARATUS FOR JOINING A PLASTIC FITTING TO A PLASTIC PIPE

[75] Inventors: Jean H. Louthan; Arlow D. Helm, both of Pryor; Ralph A. Wynne, Bartlesville; Arthur H. McElroy, Tulsa; Gale S. Roush, Bartlesville; Donald R. Conkling, Bartlesville, all of Okla.

[73] Assignee: Phillips Petroleum Company, Bartlesville, Okla.

[22] Filed: Sept. 24, 1970

[21] Appl. No.: 75,145

[52] U.S. Cl................. 156/499, 156/296, 156/556, 156/580, 156/583, 269/41, 269/45, 285/21
[51] Int. Cl..... B25b 27/00, F16l 13/02, F16l 47/02
[58] Field of Search.................. 156/499, 580, 583, 156/296, 556; 269/41, 45; 100/93 P, 293; 285/21

[56] References Cited
UNITED STATES PATENTS

| | | |
|---|---|---|
| 3,383,260 | 5/1968 | Mojonnier ................... 156/583 X |
| 3,634,167 | 1/1972 | Plontke ......................... 156/580 X |
| 3,013,925 | 12/1961 | Larsen ........................... 156/499 X |
| 3,456,941 | 7/1969 | Beskow ......................... 269/41 X |
| 3,391,045 | 7/1968 | Mojonnier et al. ............. 156/499 X |
| 268,088 | 11/1882 | Evers ............................. 100/293 X |
| 2,387,154 | 10/1945 | Kalwitz ......................... 269/41 X |
| 3,152,944 | 10/1964 | Mojonnier et al. ............. 156/499 X |
| 3,175,939 | 3/1965 | Hanes et al. .................... 156/499 |
| 3,562,073 | 2/1971 | Kibler ............................ 156/580 |

Primary Examiner—Alfred L. Leavitt
Assistant Examiner—Thomas E. Bokan
Attorney—Young and Quigg

[57] ABSTRACT

An apparatus for joining a plastic fitting to a sidewall of a plastic pipe, said apparatus having means for securing the apparatus to the plastic pipe and moving means attached to a fitting clamp for moving a fitting into forceful contact with the sidewall portion of the pipe for joinder thereto.

1 Claim, 3 Drawing Figures

PATENTED JUL 3 1973

3,743,566

INVENTORS
J. H. LOUTHAN ET AL

BY Young & Quigg

ATTORNEYS

APPARATUS FOR JOINING A PLASTIC FITTING TO A PLASTIC PIPE

In plastic piping systems, it is often desirable to attach a plastic fitting to a sidewall of a plastic pipe. This operation is complicated by the curvature of the attaching surfaces and the necessity of maintaining the fitting stationary and in forcible contact one with the other for a period of time sufficient for bonding or fusion of the parts.

This invention therefore resides in an apparatus for attaching a plastic fitting to a sidewall portion of a plastic pipe. The apparatus comprises means for releasably securing the apparatus to the pipe, means for releasably holding the fitting and moving means for moving the fitting between a first position at which the fitting is spaced from the pipe for conditioning surfaces of the pipe and fitting for adherence one to the other and a second position at which the fitting is maintained in forcible contact with the sidewall portion of the pipe for adherence one to the other. The surfaces of fitting in the pipe can be conditioned for adherence one with the other by applying a bonding material to said surfaces, heating the surfaces to a temperature sufficient to plasticize and fusion bond the surfaces, or by other methods known in the art.

Other aspects, objects, and advantages of the present invention will become apparent from a study of the disclosure, the appended claims, and the drawings.

The drawings are diagrammatic views of the apparatus of this invention.

Figure 2:
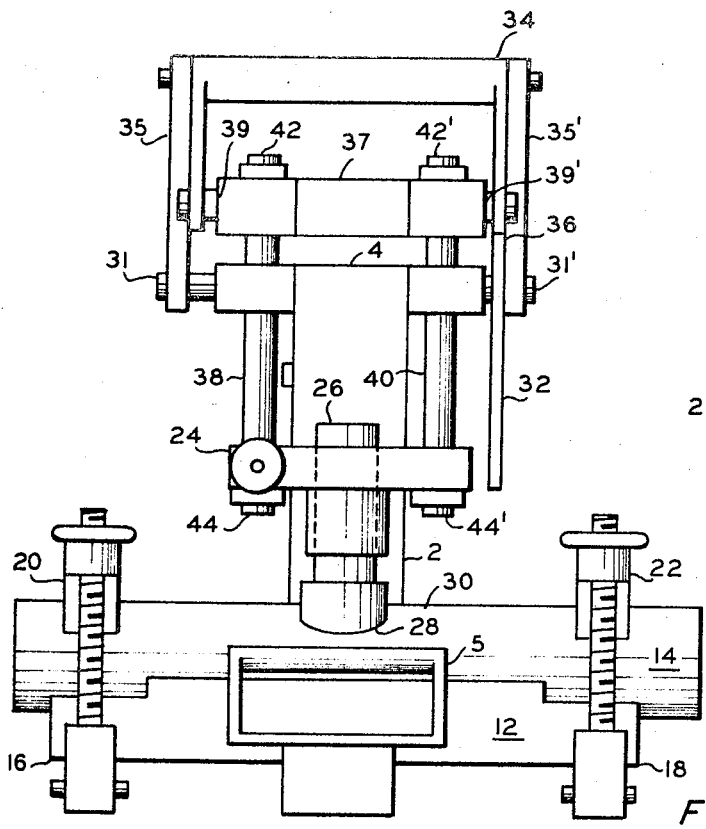
Figure 1:
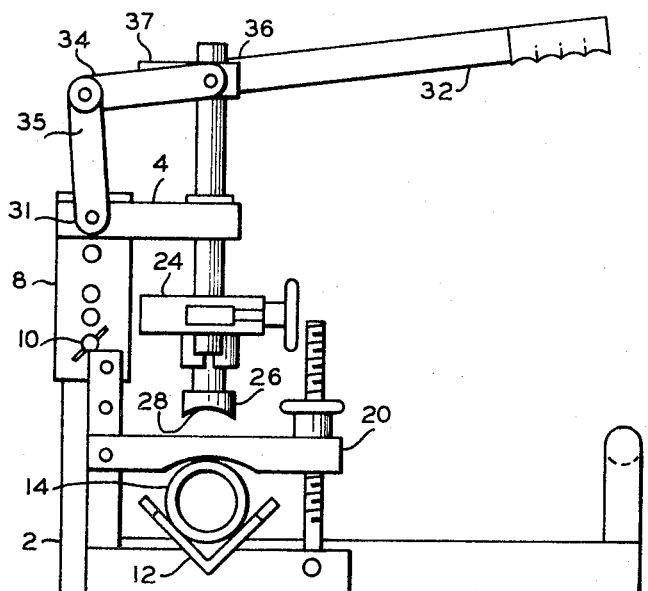

FIG. 1 shows a side view of the apparatus of this invention with a plastic pipe and a plastic fitting held thereby, portions of said apparatus being cut away, FIG. 2 shows a frontal view of the apparatus, fitting and pipe with portions of the apparatus cut away, and FIG. 3 shows a side view of portions of the apparatus and a heating means.

Referring to FIG. 1, a frame 2 is provided which has first and second end portions 4,6 and a middle portion 8. The first end portion 4 of the frame 2 is at a higher elevation than the second end portion 6 and is adjacent, generally overlies, and is spaced from the second end portion 6. The middle portion 8 of the frame 2 is preferably adjustable to control the separation of the first end portion 4 from the second end portion 6 for adapting the apparatus for use with a wide variety of plastic pipe sizes. The adjusting means can be, for example, spacers that are insertable within the middle portion 8, a middle portion that is telescoping as shown, or other means known in the art. It is prefered, however, that the middle portion 8 be telescoping in order to construct the apparatus for ease and rapidity of frame size changes. In the telescoping construction of the middle portion 8 of the frame 2, a pin 10 is provided and insertable through the telescoping portions in order to releasably secure said portions at the desired position.

An elongated cradle 12 is attached to the second end portion 6 of the frame 2. The cradle 12 can be of angle iron or other construction adapted for the nesting of a length of plastic pipe 14 therein. The cradle has first and second end portions 16,18 with at least one pipe clamping means 20 or 22 (shown in FIG. 2) attached to each end portion 16 and 18 of the cradle 12 in contact with the pipe 14 for releasably securing the apparatus to a plastic pipe 14 positioned in the cradle 12.

A fitting clamp 24 is provided for rigidly, releasably holding a plastic fitting 26 that is to be secured to the plastic pipe 14. The fitting clamp 24 and the pipe clamps 20,22 are preferably adjustable swing-away type clamps having quick release connections and hinged opposed ends for providing rapid release and increasing the speed of installing and operating the apparatus. Other clamping apparatus known in the art can be utilized so long as the type of clamps employed does not damage the plastic elements yet secures said elements against movement within the clamps.

An actuation means is connected to the frame 2 and the fitting clamp 24 for moving the fitting clamp 24 and a plastic fitting held therein between a first position shown in FIG. 1 at which the fitting clamp and plastic fitting are spaced a distance from a sidewall 30 of the plastic pipe 14 in the cradle 12 and a second position shown in FIG. 2 at which an end 28 of the plastic fitting 26 is in forcible contact with the sidewall 30 of the plastic pipe 14. The actuation means comprises a handle 32 having a first end portion 34 and a middle portion 36, and first and second actuation rods 38,40. The handle 32 is preferably pivotally connected at the first end portion 34 to one end of linkage members 35,35', which are pivotally connected at their opposite ends 31,31' to the first end portion 4 of the frame 2. The middle portion 36 of lever arm 32 is pivotally connected to both sides 39,39' of movable support 37. The rods 38,40 are axially connected at their first end 42 to movable support 37. The rods 38,40 are slidably mounted through the first end portion 4 of the frame 2, and axially connected at their second end portions 44,44' to opposed ends of the fitting clamp 24. Movement of the lever arms 32 from a first position shown 1n FIG. 1 to a second position shown in FIG. 2 moves rods 38,40 and their associated supports 37 and 24 from a position spaced from the sidewall 30 of plastic pipe 14 to a position adjacent said sidewall 30 forcing the end 28 of plastic fitting 26 into contact with sidewall 30 of plastic pipe 14.

The frame 2 and actuation means shown in the drawings are positioned and aligned relative to the cradle 12 for movement of the fitting and clamp through a path substantially perpendicular to the axis of the plastic pipe 14 nested in the cradle 12. By angularly disposing the cradle relative to the frame, it can be seen that the apparatus of this invention can be adapted for the attachment of fittings to a sidewall of the pipe with said fittings being angularly disposed to angles other than 90° relative to the axis of said pipe.

The types of plastic pipe and fittings that are joined one to the other by the apparatus of this invention are, for example, tapping tees, couplings, pipe nipples, and the like. The fittings can be manufactured from polyethylene, polypropylene, polyvinyl chloride, nylon, and other polymers used in the manufacture of plastic pipe fittings.

These plastic fittings can be caused to adhere one to the other by glueing the contacting surfaces, chemically fusing said surfaces, and thermofusing for example.

A preferred fusing method is thermofusing whereby an end 28 of the fitting 26 and/or a sidewall portion of the pipe 14 are heated to a temperature sufficient for fusion bonding of the surfaces one to the other and thereafter forcibly contacting the heated surfaces and maintaining them in forcible contact until they cool sufficiently to adhere one to the other.

This heating can be accomplished by a heating element 54 (shown in FIG. 3) having first and second opposed surfaces 56,68. This heating element 54 is preferably movably mounted on the frame 2 for movement between a first position at which the element is spaeed from the plastic pipe and fitting which are held in their associated clamps 20,22,24 and a second position at which the first surface 56 is contacting the fitting 26 and the second surface 58 is contacting a sidewall portion of the pipe 14 and heating portions of the fitting 26 and pipe 14 that are in contact with one another in the second position of the fitting clamp 24. The first surface 56 of the heating element 54 has a configuration for mating with an end portion 28 of the plastic fitting 26 and said second surface 58 has a configuration for mating with the sidewall portion of the pipe 14. The handle 32 is thereafter actuated to move the fitting clamp downwardly and bring the plastic fitting 26 into contact with the first surface of the heating element 54. After both pipe and fitting are heated to a sufficient temperature the handle is moved in a direction to move the fitting 26 a spaced distance from the heating element 54, the heating element is moved from between the pipe and the fitting and the handle is then actuated to urge the fitting 26 and pipe 14 into forcible contact one with the other.

In order to provide uniform rapid heating that is easy to operate, it is preferred that the heating element 54 be an adjustable electrical heater constructed to increase the temperature of the pipe and the fitting to a temperature sufficient to permit fusion bonding of the polymers used in the manufacture of the pipe and fittings. The heating element 54 is connected to an outside power source (not shown) through line 62.

In the operation of the apparatus of this invention, an elongated plastic pipe is secured against pipe movement in the cradle by the pipe clamps. A sidewall portion of the pipe and a portion of the plastic fitting that is to be secured to the sidewall are then conditioned for bonding of one to the other by, for example, heating portions of the pipe and fitting to a fusion temperature. This temperature may be about 475° F for pipe and fittings manufactured from very high or ultra high molecular weight polyethylene. The handle of the apparatus is then manipulated to move the heated portion of the fitting into forcible contact with the heated portion of the pipe sidewall. The fitting is thereafter maintained by the apparatus in forcible contact with the sidewall for a time sufficient for cooling of the fitting and pipe and adhering one to the other with said fitting being maintained at an angle of about 90° relative to an axis of the pipe.

The type fitting generally utilized with this apparatus is a plastic pipe nipple for subsequent installation of a lateral line thereto. After the pipe nipple is installed, the plastic pipe circumscribed by the inner surface of the pipe nipple can be drilled out thereby providing fluid communication of the pipe with the nipple. Other plastic fittings of various configurations can be attached to a pipe by the apparatus and method of this invention by adjusting the frame to accommodate the fitting and providing a fitting clamp adapted to maintain that particular fitting. The cradle and pipe clamps can also be constructed to maintain a multiplicity of pipe sizes.

Other modifications and alterations of this invention will become apparent to those skilled in the art from the foregoing discussion and accompanying drawing, and it should be understood that this invention is not to be unduly limited thereto.

What is claimed is:

1. An apparatus for attaching a plastic fitting to a sidewall of a plastic pipe with axes of the plastic pieces being substantially perpendicular relative one to the other, comprising:

a frame having first and second end portions and a middle portion, said first portion being at a higher elevation and adjacent said second portion;

an elongated cradle having first and second end portions, being attached to the second end portion of the frame at a location between said first and second end portions of the frame, and being of a configuration for receiving the plastic pipe;

at least two pipe clamps each attached to a separate end portion of the cradle for releasably securing the plastic pipe to the cradle and maintaining said pipe at a location at which a sidewall of the pipe is beneath the first portion of the frame;

a third clamp being of a configuration for rigidly, releasably holding the plastic fitting oriented with said plastic fitting axis substantially perpendicular to the axis of the pipe maintained in the cradle;

first and second actuation rods each having first and second end portions, being slidably mounted through the first end portion of the frame and connected at their second end portions to the third clamp, and being oriented and movable between the first position at which the third clamp and first conduit are spaced a distance from a sidewall of the plastic pipe in the cradle and a second position at which an end of the plastic fitting is in forcible contact with the sidewall of the plastic pipe in the cradle with said plastic fitting being substantially perpendicular to said pipe;

a handle having a first end portion and a middle portion and being pivotally connected to the frame and the first and second actuation rods for movement of the third clamp between the first and second positions in response to movement of the handle; and a heating element having first and second opposed surfaces and being movably mounted on the frame for movement between the first position at which the element is spaced from the plastic pieces in their associated clamping means and a second position at which the first surface of the heating element is contacting an end of the plastic fitting and the second surface is contacting a sidewall portion of the pipe for simultaneously heating portions of said plastic fitting and plastic pipe, said first surface having a configuration for mating with the end of the plastic fitting and said second surface having a configuration for mating with the sidewall of the pipe.

* * * * *